US008590959B2

(12) United States Patent
Durm et al.

(10) Patent No.: US 8,590,959 B2
(45) Date of Patent: Nov. 26, 2013

(54) WINDOW BLIND FOR A POLYGONAL WINDOW OF A VEHICLE DOOR OF A MOTOR VEHICLE

(75) Inventors: Juergen Durm, Muehlacker (DE); Sascha Ruckwied, Fellbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 369 days.

(21) Appl. No.: 13/085,791

(22) Filed: Apr. 13, 2011

(65) Prior Publication Data
US 2011/0260497 A1  Oct. 27, 2011

(30) Foreign Application Priority Data
Apr. 23, 2010  (DE) .................... 10 2010 017 960

(51) Int. Cl.
*B60J 1/20* (2006.01)
(52) U.S. Cl.
USPC ............................. 296/97.8; 160/370.22
(58) Field of Classification Search
USPC ................................... 296/97.8; 160/370.22
See application file for complete search history.

(56) References Cited

U.S. PATENT DOCUMENTS

| | | | |
|---|---|---|---|
| 5,992,498 A * | 11/1999 | Boston | 160/370.22 |
| 2008/0223534 A1* | 9/2008 | Hansen | 160/370.22 |
| 2008/0272612 A1 | 11/2008 | Harnischfeger et al. | |
| 2009/0008048 A1 | 1/2009 | Stark | |

FOREIGN PATENT DOCUMENTS

| | | |
|---|---|---|
| DE | 10 2005 033 763 | 2/2006 |
| DE | 10 2004 045 726 | 4/2006 |
| DE | 10 2005 038 373 | 2/2007 |
| DE | 10 2006 048 459 | 1/2008 |
| DE | 10 2007 021 651 | 11/2008 |
| DE | 10 2007 029 290 | 1/2009 |
| FR | 2 851 203 | 8/2004 |

* cited by examiner

*Primary Examiner* — Joseph Pape
(74) *Attorney, Agent, or Firm* — Gerald E. Hespos; Michael J. Porco; Matthew T. Hespos

(57) ABSTRACT

A window blind has upper and lower outer edges that follow contours of the window and may be arched slightly to the outside. Upper and lower force-transmitting, low-expansion reinforcing elements made from a cord, a thread or a fiber network are joined fixedly to the outer edges of the knitted fabric of the blind. The reinforcing elements extend between a winding shaft and a pull-out profile that lies opposite the winding shaft on the end side.

14 Claims, 2 Drawing Sheets

WINDOW BLIND FOR A POLYGONAL WINDOW OF A VEHICLE DOOR OF A MOTOR VEHICLE

CROSS REFERENCE TO RELATED APPLICATION

This application claims priority under 35 USC 119 to German Patent Application No 10 2010 017 960.4 filed on Apr. 23, 2010, the entire disclosure of which is incorporated herein by reference.

BACKGROUND OF THE INVENTION

1. Field of the Invention

The invention relates to a window blind for a window of a motor vehicle.

2. Description of the Related Art

DE 10 2007 021 651 A1 discloses a film, in particular a multiple layer sunblind film or sunblind composite film provided with a reinforcing material on an edge for partial stabilization. The reinforcing material is joined to the film in a material to material manner.

It is an object of the invention to provide a window blind for a polygonal window of a vehicle door of a motor vehicle so that the window blind has an outer edge profile that is free of undulations on the edge side in the pulled-out shielding position.

SUMMARY OF THE INVENTION

The invention relates to a blind with outer edges that follow slightly arcuate or straight bounding contours of a polygonal window pane and that have a profile free of undulations. The blind has a winding shaft, a pull-out profile and a fabric that extends between the winding shaft and the pull-out profile. The pull-out profile may function as a grip for moving the blind. Upper and lower outer edges of the fabric follow the bounding contours of the pane. At least one force-transmitting reinforcing element is joined fixedly to outer edges of a fabric and extends between the winding shaft and the pull-out profile. The reinforcing elements are joined fixedly to the upper and lower outer edges of the fabric and may be formed, for example, from a low-expansion cord, a thread and/or a fiber network. The reinforcing element is arranged between the winding shaft and the pull-out profile in proximity to the edges of the fabric so that the edges of the fabric are tensioned tautly in the shielding position of the blind. A direct force flow is achieved between the winding shaft and the pull-out profile by the incorporated reinforcing elements in the outer edges of the blind. These outer edges are, for example, pre-arched and follow the slightly arcuate bounding edges of the pane. This force flow tensions the outer edges tautly in the pull-out position to avoid undulation of the edges of the blind and to ensure optimum planar contact with respect to the pane.

Substantially vertical edge sections at opposite ends of the fabric are joined (e.g. clamped) to the winding reel or shaft and to the pull-out profile. The upper and lower pre-arched outer edges of the fabric extend between the opposite ends of the vertical edge sections. The upper and lower outer edges of the fabric lie outside a force flow area defined between the vertical edge sections of the fabric that are clamped to the pull-out profile and the winding reel. The force-transmitting reinforcing elements at the outer edges of the fabric achieve a force flow outside the force flow area between the winding shaft and the pull-out profile.

At least two spaced apart vertically oriented reinforcing inserts preferably are integrated into the knitted fabric of the blind. The reinforcing inserts are joined to the upper and lower outer edges of the blind and are fastened to the force-transmitting reinforcing elements. The reinforcing inserts stabilize the blind in the plane, and the connection to the edge-side force-transmitting reinforcing elements achieve an optimum smooth edge profile without undulations in the pulled-out shielding position of the blind.

The force-transmitting reinforcing element preferably is made from a stronger material than the fabric of the blind to achieve the smooth edge profile of the blind free of undulations. In particular, the force-transmitting low-expansion reinforcing element in the edges of the blind may be made of a polyamide fiber network or the like. More particularly, the reinforcing element can be a para-aramid or a Technora material.

The fiber network preferably is joined to, for example sewn into, the outer edges of the fabric of the blind to fixedly join the reinforcing element to the fabric. The fiber network in the edges of the knitted fabric can be inserted by means of a loop and can be joined fixedly to the edges of the fabric by an edge weld. This join of the reinforcing element in the outer edges of the blind achieves a fastening in the fabric that permits direct force transmission via the reinforcing elements in the outer edges.

One exemplary embodiment of the invention is shown in the drawings and will be described in greater detail in the following text.

DETAILED DESCRIPTION OF THE PREFERRED EMBODIMENTS

Figure 1:
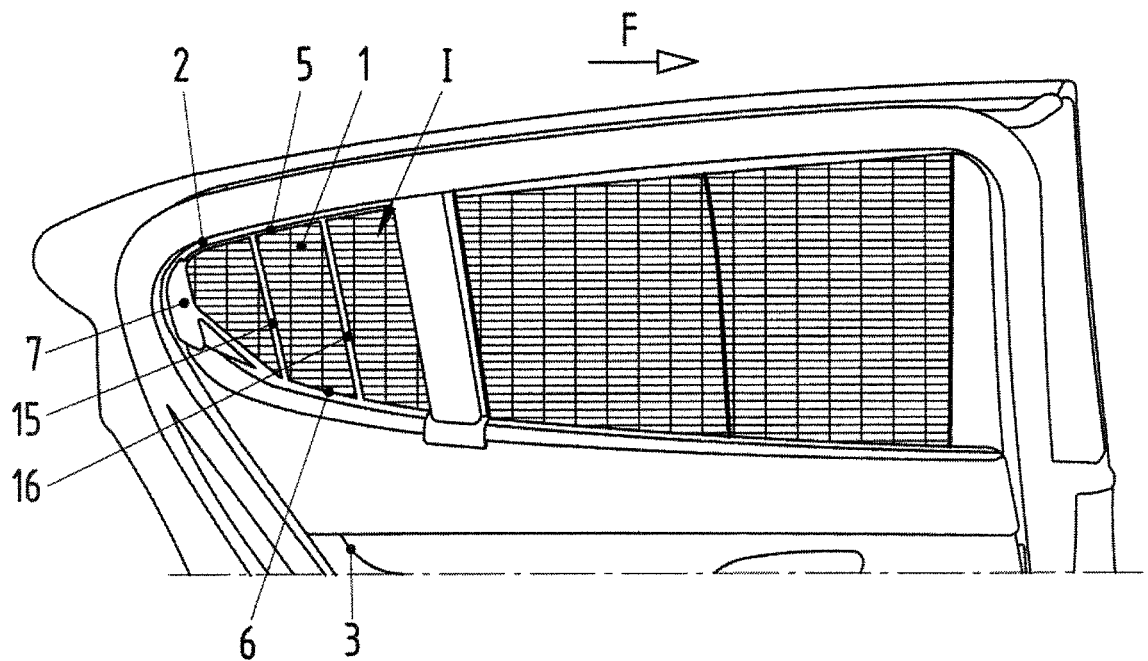
FIG. 1 shows a blind installed in front of a rear side pane of a vehicle door.
Figure 2:
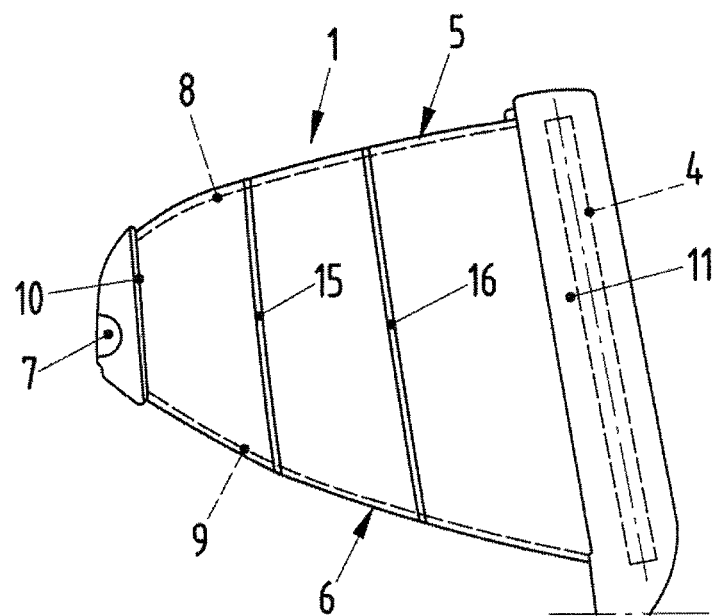
FIG. 2 is a front view of the blind which that has a knitted fabric with a front winding shaft and an opposite rear pull-out profile.
Figure 3:
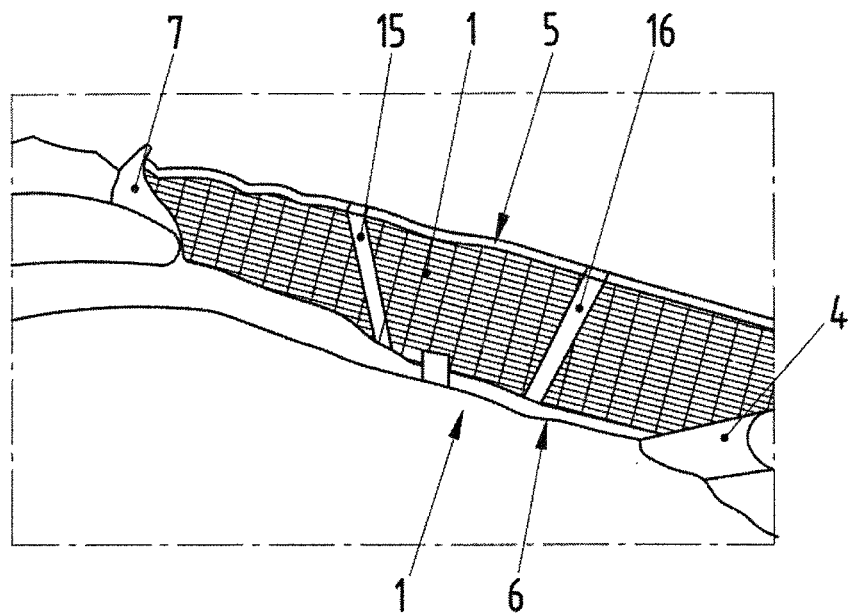
FIG. 3 is a diagrammatic illustration from above of a smooth outer edge of a blind that has an edge-side reinforcing element.

A window blind 1 for a polygonal window 2 in a vehicle door 3 includes a knitted fabric and is arranged on a winding shaft 4. The blind 1 can be adjusted from a rest position rolled up on the winding shaft 4 to a pulled-out shielding position I, which is shown in FIG. 1. The polygonal window 2 is covered in position I, and upper and a lower outer edge 5, 6 of the blind 1 follow the shape profile of the frame of the side window 2, which can have an arched or a straight window frame or bounding contours. In the exemplary embodiment, the window 2 is a generally triangular side window.

The blind 1 has upper and lower outer edges 5 and 6 that arch slightly to the outside in a plane and follow the bounding contours of the window 2 to achieve optimum shielding of the window 2. Force-transmitting, low-expansion reinforcing elements 8, 9 are arranged respectively in the outer edges 5 and 6 between the winding reel 4 and a pull-out profile 7 that is joined to the blind 1 opposite the winding reel 4. The reinforcing elements 8, 9 are joined fixedly to the outer edges 5 and 6 of the knitted fabric.

Each reinforcing element 8, 9 may be a cord, a thread or a fiber network or a force-transmitting element having the same effect. The edge reinforcing elements 8, 9 ensure that the edges 5, 6 of the blind 1 are tensioned tautly in the shielding position I.

Figure 4:
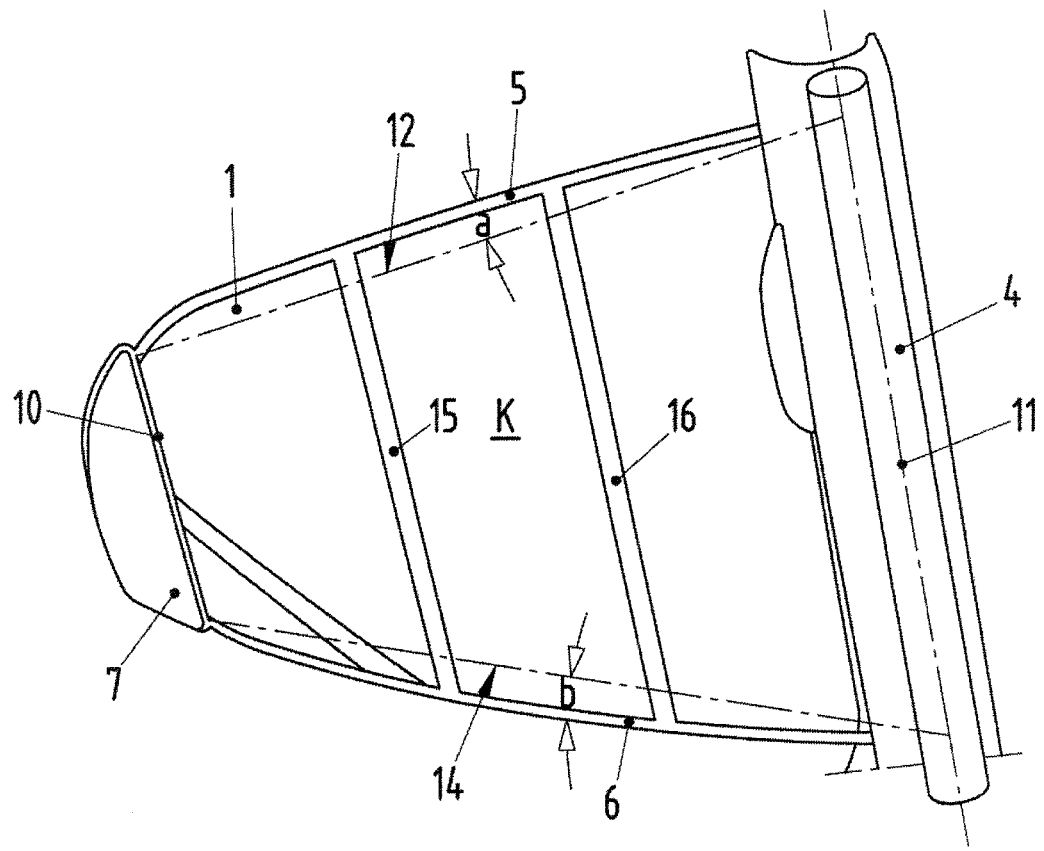
FIG. 4 is a front view of a blind with a force flow area (illustrated by dash dotted lines) of the knitted fabric between the winding shaft and the pull-out profile.

A rear vertical edge section 10 of the blind 1 is joined to the pull-out profile 7 and a front vertical edge section 11 of the blind 1, as viewed in relation to the driving direction F, is clamped to the winding reel 4. The clamped edge sections 10, 11 form a force flow area K that is edged by dash dotted lines in FIG. 4. The force flow area K is provided between the winding shaft 4 and the pull-out profile 7 and has straight bounding lines 12 and 14 that extend at a spacing a and b inward from the outer edges 5, 6 of the blind 1. As a result, the outer edges 5, 6 lie outside the force flow area K and therefore no tautening tension can be built up in the outer edges 5, 6 without the reinforcing elements 8, 9 of the outer edges 5, 6.

Vertical reinforcing inserts 15, 16 are incorporated into the blind 1 to hold the knitted fabric in a planar form. The edge reinforcing elements 8, 9 are joined to the ends of the reinforcing inserts 15, 16.

The reinforcing elements 8, 9 in the outer edges 5, 6 of the blind 1 are made of a stronger material than the knitted fabric of the blind 1. In particular, the reinforcing element 8, 9 may be a polyamide fiber network that is sewn into the edges 5, 6 of the knitted fabric. According to a further embodiment, the fiber network can be inserted into a loop at the edges 5, 6 of the knitted fabric and then subsequently can be joined to the edges 5, 6 of the knitted fabric by an edge weld. The reinforcing element 8, 9 also can be a para-aramid or a Technora material.

The reinforcing elements 8, 9 in the outer edges 5, 6 of the knitted fabric ensure that a force transmission between the winding shaft 4 and the pull-out profile 7 is to be initiated via the outer edges 5, 6 of the knitted-fabric section. A heat-resistant material, such as the polyamide fiber network (braided fishing line) preferably is selected here to withstand thermal. The braided cords are distinguished by high thermal resistance and minimum expansion. The para-aramids, such as Kevlar or Technora, also can be used, should even higher resistance be required.

The thread, cord or network has to be joined fixedly to the knitted fabric or the edge weld of the knitted fabric. This can take place, for example, by the fiber network/the thread being sewn in. If there is an edge weld, a subsequent edge weld is also conceivable after looping through or insertion.

What is claimed is:

1. A window blind for a window of a vehicle door or a rear window of a motor vehicle, the window having a frame with a shape profile and a pane inward of the frame, the window blind comprising:
   a winding shaft mounted to the motor vehicle in proximity to the window;
   a fabric having a first end arranged on the winding shaft and a second end opposite the first end, the fabric being adjustable between a rolled-up rest position and a pulled-out shielding position in which the window is covered, the fabric having upper and lower outer edges substantially conforming to the shape profile of the frame of the window;
   a pull-out profile in proximity to the second end of the fabric;
   upper and lower force-transmitting, low-expansion reinforcing elements joined fixedly to the respective upper and lower outer edges of the fabric and extending between the winding shaft and the pull-out profile of the blind; and
   at least two vertically oriented reinforcing inserts spaced apart from one another and having opposite ends joined respectively to the upper and the lower outer edges of the fabric and to the force-transmitting reinforcing elements.

2. The window blind of claim 1, wherein the reinforcing elements comprise at least one of a cord, a thread and a fiber network, and are joined fixedly to the edges of the fabric so that the edges of the fabric are tensioned in the shielding position of the blind.

3. The window blind of claim 1, wherein the first and second ends of the fabric have substantially vertical edge sections joined respectively to the winding shaft and the pull-out profile.

4. The window blind of claim 3, wherein the substantially vertical edge sections each have upper and lower ends, upper straight lines extending between the upper ends of the substantially vertical edge sections and lower straight lines extending between the lower ends of the substantially vertical edge sections, the upper and lower straight lines defining a force flow area spaced inwardly from the upper and lower outer edges in the shielding position of the fabric.

5. The window blind of claim 1, wherein the reinforcing elements at the outer edges of the fabric are made of a stronger material than the fabric.

6. The window blind of claim 1, wherein the reinforcing elements at the outer edges of the fabric are made of a polyamide fiber network.

7. The window blind of claim 6, wherein the fiber network is sewn into the outer edges of the fabric of the blind.

8. A window blind for a window of a vehicle door or a rear window of a motor vehicle, the window having a frame with a shape profile and a pane inward of the frame, the window blind comprising:
   a winding shaft mounted to the motor vehicle in proximity to the window;
   a fabric having a first end arranged on the winding shaft and a second end opposite the first end, the fabric being adjustable between a rolled-up rest position and a pulled-out shielding position in which the window is covered, the fabric having upper and lower outer edges substantially conforming to the shape profile of the frame of the window, the fabric having loops at the outer edges;
   a pull-out profile in proximity to the second end of the fabric;
   upper and lower force-transmitting, low-expansion reinforcing elements joined fixedly to the respective upper and lower outer edges of the fabric and extending between the winding shaft and the pull-out profile of the blind, the reinforcing elements being inserted into the loops at the outer edges of the fabric and being joined fixedly to the outer edges of the fabric by an edge weld.

9. The window blind of claim 1, wherein the reinforcing element is a para-aramid material.

10. The window blind of claim 1, wherein at least one of the upper and lower edges of the fabric is curved arcuately out between the first and second ends of the fabric, and wherein a corresponding one of the upper and lower reinforcing elements is curved arcuately out to follow the respective edge of the fabric.

11. The window of claim 1, wherein the fabric is a knitted fabric.

12. A motor vehicle, comprising:
   a window having substantially opposed upper and lower outer edges, at least one of the upper and lower outer edges of the window being curved convexly out away from the other of the upper and lower outer edges thereof; and a window blind having:

a winding shaft mounted in proximity to the window;

a fabric having a first end fixed on the winding shaft, a second end opposite the first end, and upper and lower outer edges extending between the first and second ends, the upper and lower edges of the fabric substantially conforming to shapes of the upper and lower outer edges of the window so that at least one of the upper and lower outer edges of the fabric is curved convexly out and away from the other of the upper and lower edges thereof, the fabric being adjustable between a rolled-up rest position and a pulled-out shielding position in which the fabric covers the window;

a pull-out profile fixed to the second end of the fabric;

upper and lower reinforcing elements joined fixedly to the respective upper and lower outer edges of the fabric and extending between the winding shaft and the pull-out profile of the blind, at least one of the upper and lower reinforcing elements being curved convexly out along the corresponding upper and lower edge of the fabric; and at least two vertically oriented reinforcing inserts spaced apart from one another and having opposite ends joined respectively to the upper and lower reinforcing elements.

13. The motor vehicle of claim 12, wherein the first and second ends of the fabric have substantially vertical edge sections joined respectively to the winding shaft and the pull-out profile, the substantially vertical edge sections each have upper and lower ends, at least one of the upper and lower reinforcing elements being curved outwardly beyond upper and lower straight lines extending respectively between the upper ends of the substantially vertical edge sections and between the lower ends of the substantially vertical edge sections.

14. The motor vehicle of claim 13, wherein the reinforcing elements at the outer edges of the fabric are made of a stronger material than the fabric.

* * * * *